Mar. 6, 1923.
B. SCHARLIN
1,447,436
SANDING DEVICE FOR MOTOR VEHICLES
Filed Sept. 28, 1921
2 sheets-sheet 2
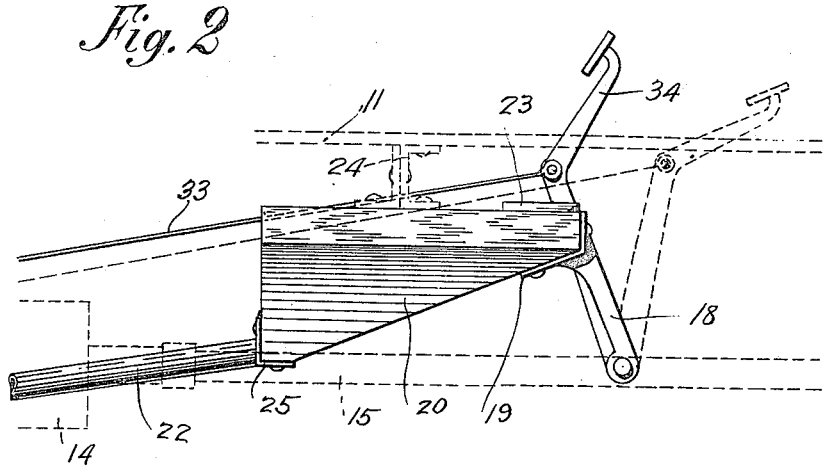
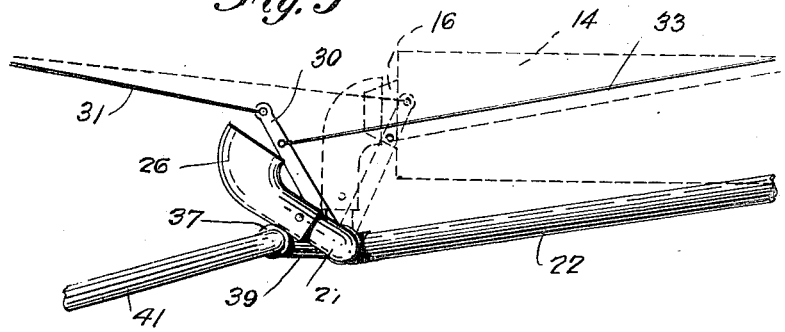
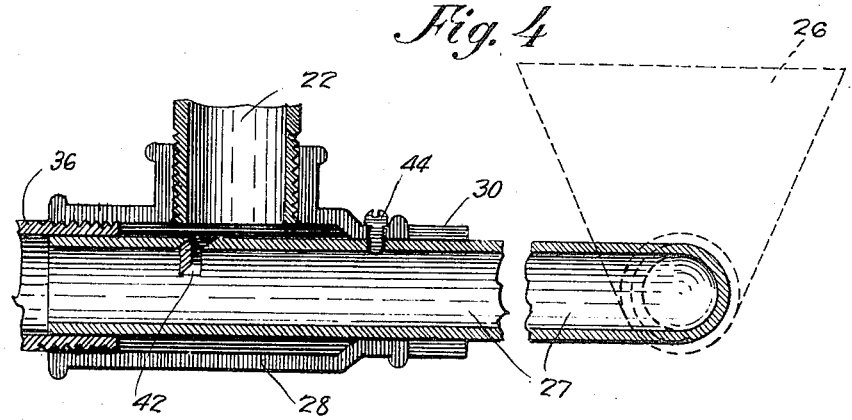
INVENTOR
Bernard Scharlin
BY Percy Freeman
ATTORNEY Patented Mar. 6, 1923.

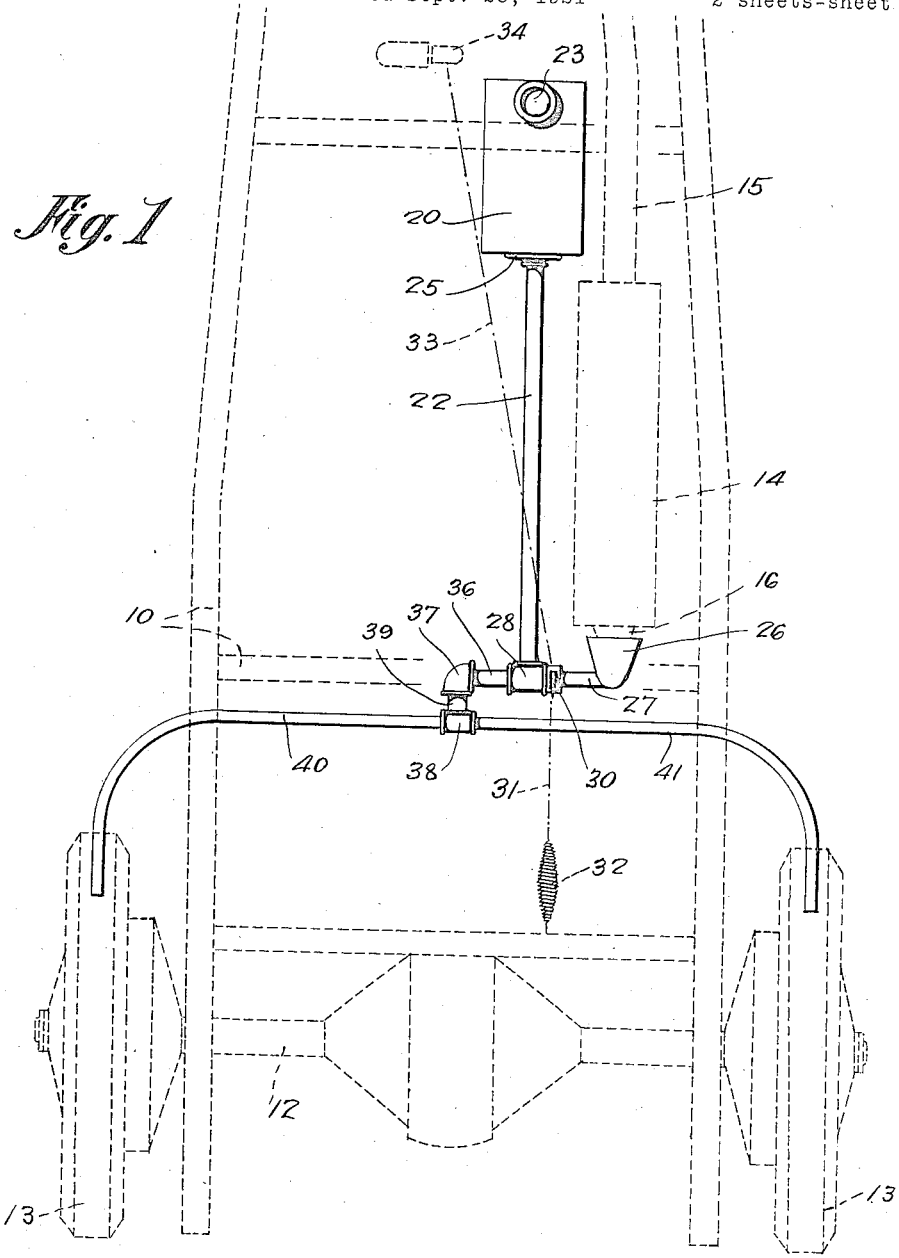

1,447,436

UNITED STATES PATENT OFFICE.

BERNARD SCHARLIN, OF NEW YORK, N. Y.

SANDING DEVICE FOR MOTOR VEHICLES.

Application filed September 28, 1921. Serial No. 503,833.

*To all whom it may concern:*

Be it known that I, BERNARD SCHARLIN, a citizen of the United States, and resident of 238 East 20th Street, city of New York, in the county of New York and State of New York, have invented certain new and useful Improvements in Sanding Devices for Motor Vehicles, of which the following is a specification.

The principal purpose of this invention is to provide means for preventing slipping, sliding or side skidding of the power driven wheels of a vehicle by forcing into their path a copious stream of gritty material whereby the tractive effect of the tires is rendered positive, irrespective of roadway or weather conditions.

Another object is in the provision of means for utilizing the exhaust gases of the motor in producing the blast by which the material is delivered from its source, through the pipe distribution system, to its points of application, the same being under the easy and instant control of an operator.

These and other objects, which will become apparent as the description proceeds, are attained by the novel construction, combination and arrangement of parts hereinafter explained and shown in the accompanying drawings, forming a material part of this disclosure, and in which:—

Figure 1 is a top plan view of an apparatus, made in accordance with the invention, and indicating its application to a conventional type of vehicle, shown in broken lines.

Figure 2 is a fragmentary side elevational view of the front part of the same showing the sand reservoir and feed control pedal.

Figure 3 is a similar view of the rear portion of the apparatus.

Figure 4 is an enlarged fragmentary longitudinal sectional view of the valve.

Stated in general terms the apparatus comprises a sand supply tank secured below the floor of the vehicle, from which leads a pipe extending towards the rear and there branched so that its ends project in close proximity, tangentially with the wheel tires.

Intermediate in the length of the feed pipe is a valve connection to the exhaust of the motor, this valve being of peculiar construction, held normally open by resilient means and moved into operative position by a foot lever or analogous device.

Referring to the drawings in detail, the numeral 10 designates in general the skeleton frame of a conventional type of chassis, braced by cross bars and provided with a floor 11. At the rear is an axle 12 mounted in driving wheels 13, actuated as usual by transmission from a motor, the exhaust muffler of which, indicated by the numeral 14, is supported in the usual manner by strap or bands secured to the underside of the floor.

An exhaust pipe 15 forms a connection between the exhaust manifold of the engine and the muffler, conveying thereto under considerable pressure, the exhaust gases from the explosion chambers of the engine, and a hollow cone shaped projecting element 16 provides an outlet from the muffler.

Forward of the muffler, below the foot board of the vehicle, is a bracket 18, rigidly secured to the exhaust pipe 15, an upper extending portion having a widened frame formation 19, adapted to fixedly engage a generally rectangular container 20, provided with an angularly disposed bottom, down which, sand stored in the container will flow by gravity to its lower rear portion, passing through an opening therein and entering a pipe 22.

A removable closure 23 provides means for refilling the container when the sand supply is exhausted, and means for supporting the rear portion of the container is shown by the channel iron bracket 24 secured between the floor and the container.

The pipe 22 is disposed longitudinally of the vehicle, one end being rigidly connected to the container at its rear by means of an angular plate 25.

A hollow funnel 26 is attached to a tubular pipe 27, turned at a right angle, its opposite end passing rotatably through a T shaped head 28 the side opening of which engages the rear end of the pipe 22. A lever 30 has a hub formed at one end, bored to fit over the tube 27 and to which it is secured. A cable 31 is attached to the free end of the lever and the other end of the cable engages a spring 32 which is attached to a cross member at the rear of the chassis. The action of this spring causes a backward rotary movement of the tube 27 and with it the funnel 26 into the inoperative position shown by the solid lines in Figure 3.

Another cable 33 is attached to the lever 30 at a point below the attachment of cable 31, the other end of the cable 33, being carried forward and attached to a foot pedal 34 extending upward through the floor 11.

Forward pressure applied to the foot pedal 34 carries the pedal forward into the position shown by the dotted lines in the Figure 2, and by the cable connections the funnel 26 is brought into engagement with the muffler outlet 16 as shown by dotted lines in Figure 3.

Screw-threaded into the head element 28 is a nipple or short pipe connection 36, its opposite end engaging an elbow 37 which is connected with a T-fitting 38.

Curved pipes 40 and 41 are secured in the opposite ends of the T 38 and extend outward and downward into a position transversely central with the rear wheels of the vehicle.

The tube 27 extends entirely through the T-shaped head 28 and enters the short pipe 35 for a short distance, providing a rear bearing for the pipe.

An angular slot 42 is provided through the wall of the tube 27 slanting in a direction away from the receiving or funnel end of the tube and is positioned with respect to the periphery of the tube 27 so that the slot will face the tube 22 when the funnel 26 is in engagement with the muffler outlet 16.

From the foregoing it will be seen that dry sand contained within the container 20 will by gravity and vibration be caused to flow through the downwardly inclined pipe 22 into the T shaped head 28, meeting therein the rotatable tube 27 from the funnel 26 and receive the exhaust gases emitted under pressure from the muffler 14. Commercial pipe fittings 36, 37, 38 and 39 form connections for directing the flow of the sand to the distributing pipes 40 and 41.

By reference to Figure 4 the slot 42 is shown open to the end of the tube 22, and the sand flowing through the slot 42 is impelled forward by the force of the gases received from the muffler 14.

The tube 27 being rotatably secured within the head 28 is operable by means of the foot pedal 34 and a spring drawn cable, connected to the pedal lever rotates the tube into inoperative position when the foot is removed from the pedal.

The tube 27 in combination with the slot 42 therein functions as a sand valve, checking the flow of sand when partially rotated, the angle of rotation being controlled by the screw 44, threadably engaged in the tube 27 and moving within a slot provided in the head 28.

From the foregoing it will be seen that a simple device for this purpose has been disclosed in the preferred form of its embodiment, but it is not desired to restrict the details to the exact construction shown, it being obvious that changes, not involving the exercise of invention may be made without conflicting with the scope of the appended claims.

Having thus described my invention, what I claim as new and desire to secure by Letters Patent, is:—

1. In a sanding apparatus, the combination with a motor driven vehicle, of a sand box, a gravity feed pipe system therefrom adapted to deliver sand in advance of the wheels, a hollow swing arm having a funnel head engageable with the muffler exhaust, said arm communicating with the pipe system, and means for moving said arm into and out of operative position.

2. In a sanding apparatus, the combination with a motor driven vehicle, of a sand box, a gravity feed pipe system therefrom adapted to deliver sand in advance of the wheels, connections adapted to be rocked into engagement with the muffler exhaust whereby spent gases are discharged into said pipe system intermediate the sand box and pipe terminals, pedal means for actuating said connections into operative position, and resilient means for disengaging said connections.

3. In a sanding apparatus, the combination with a motor driven vehicle, of a sand box, a gravity feed pipe system therefrom adapted to deliver sand in advance of the wheels, a hollow swing arm having a funnel head engageable with the muffler exhaust, a tube communicating with the said swing arm and said pipe system, means in said tube for admitting and initially impelling the flow of sand, and other means for continuing the flow through said pipe system to points of delivery.

4. In a sanding apparatus, the combination with a motor driven vehicle, of a sand reservoir carried thereby, a downwardly inclined conduit extending rearwardly, a three way head having its side opening engaging said conduit, branch pipes communicating with one of the openings in said head, said pipes terminating centrally in front of the driving wheels of the vehicle, tangentially thereto, a lever hub adjacent the opposite opening of said head, a hollow angular arm fixed in said hub, and a funnel at the end of said arm, said funnel being adapted to intercept gases from the motor of the vehicle when in operative position, and the lever supplying means for normally retracting said funnel and means for applying said funnel to the gas exhaust.

Signed at New York, in the county of New York and State of New York, this 8th day of September, A. D. 1921.

BERNARD SCHARLIN.